(12) United States Patent
Singh et al.

(10) Patent No.: US 8,067,660 B2
(45) Date of Patent: Nov. 29, 2011

(54) METHOD AND SYSTEM FOR RESTRAINING A CHEMICAL DISCHARGE

(75) Inventors: Rajiv R. Singh, Getzville, NY (US); Ian Shankland, Randolph, NJ (US); Colleen D. Szuch, Convent Station, NJ (US)

(73) Assignee: Honeywell International Inc., Morristown, NJ (US)

( * ) Notice: Subject to any disclaimer, the term of this patent is extended or adjusted under 35 U.S.C. 154(b) by 783 days.

(21) Appl. No.: 12/132,751

(22) Filed: Jun. 4, 2008

(65) Prior Publication Data

US 2009/0005629 A1 Jan. 1, 2009

Related U.S. Application Data

(60) Provisional application No. 60/943,033, filed on Jun. 8, 2007, provisional application No. 60/943,430, filed on Jun. 12, 2007.

(51) Int. Cl.
*A62D 3/30* (2007.01)
*A62D 3/33* (2007.01)

(52) U.S. Cl. ............ 588/313; 588/18; 588/20; 588/315; 588/400; 588/405; 588/410; 588/413; 588/414; 588/415

(58) Field of Classification Search .......... 588/252, 588/255, 18, 20, 313, 315, 400, 405, 410, 588/413, 414, 415
See application file for complete search history.

(56) References Cited

U.S. PATENT DOCUMENTS

| | | | |
|---|---|---|---|
| 2,449,270 A | | 9/1948 | Bennett |
| 4,077,901 A * | | 3/1978 | Arnold et al. |
| 4,341,078 A | | 7/1982 | Weitzen |
| 4,382,026 A * | | 5/1983 | Drake et al. |
| 4,383,868 A | | 5/1983 | Braley |
| 4,400,313 A * | | 8/1983 | Roberson et al. |
| 4,459,211 A * | | 7/1984 | Carini |
| 4,693,284 A * | | 9/1987 | Dugger |
| 4,975,224 A * | | 12/1990 | Pringle .................. 588/255 |
| 5,465,536 A | | 11/1995 | Buchanan et al. |
| 5,476,993 A * | | 12/1995 | Richmond |
| 5,531,290 A | | 7/1996 | Furuichi |
| 5,588,785 A * | | 12/1996 | Holland |
| 5,663,474 A | | 9/1997 | Pham et al. |
| 5,663,477 A * | | 9/1997 | Honeycutt .................. 588/320 |
| 5,705,717 A | | 1/1998 | Puy et al. |
| 5,732,363 A * | | 3/1998 | Suzuki et al. |
| 5,766,483 A | | 6/1998 | Luly et al. |
| 5,862,494 A * | | 1/1999 | McDonnell et al. |
| 5,916,122 A * | | 6/1999 | McClure et al. |
| 6,177,058 B1 | | 1/2001 | Singh et al. |
| 6,578,639 B1 | | 6/2003 | Osime |
| 6,670,281 B2 | | 12/2003 | Luly et al. |
| 6,955,638 B1 * | | 10/2005 | Atkins et al. |
| 2005/0096495 A1* | | 5/2005 | Mason et al. |
| 2007/0015948 A1* | | 1/2007 | Cadieux et al. |

FOREIGN PATENT DOCUMENTS

| | | |
|---|---|---|
| DE | 102005018000 | 9/2006 |
| GB | 2050388 | 1/1981 |

* cited by examiner

*Primary Examiner* — Wayne Langel

(57) ABSTRACT

A method for restraining a chemical discharge comprising (a) deploying a binding agent into a receptacle containing a hazardous material in a liquid state upon the occurrence of at least one predetermined event that increases the risk of accidentally discharging or leaking the hazardous material from the receptacle; and (b) contacting the hazardous material with the binding agent to form a composition comprising at least a portion of the hazardous material and the binding agent and having at least one property selected from a solid or semisolid state, a viscosity greater than the viscosity of the hazardous material at ambient conditions, a vapor pressure lower than the vapor pressure of the hazardous material at ambient conditions, and a surface tension greater that the surface tension of the hazardous material.

19 Claims, No Drawings

METHOD AND SYSTEM FOR RESTRAINING A CHEMICAL DISCHARGE

CROSS REFERENCE TO RELATED APPLICATIONS

This application is related to, and claims priority to, U.S. Application No. 60/943,033, filed Jun. 8, 2007, and U.S. Application No. 60/943,430, filed Jun. 12, 2007, both of which are incorporated herein by reference.

BACKGROUND

1. Field of Invention

The present invention relates to a method and system for restraining a chemical discharge. More particularly, the invention relates to a method and system for restraining an accidental discharge of a hazardous chemical from a receptacle.

2. Description of Related Art

Hazardous materials are used in numerous applications that are vital to the economy and public. For example, hazardous liquids are used as fuel for vehicles, to heat and cool homes and offices, and as cleaners and/or intermediates for numerous commercial manufacturing processes.

Millions of tons of explosive, poisonous, corrosive, flammable, radioactive, and otherwise dangerous liquids are transported every day. Such hazardous materials are moved by plane, truck, rail, or ship in quantities ranging from several ounces to several thousand barrels. Frequently, these hazardous materials are moved through densely populated or environmentally sensitive areas where the consequences of an accidental spillage could result in injury, loss of life, or serious environmental damage.

Methods for immobilizing hazardous liquids and treating hazardous liquids spills are known. For example, U.S. Pat. No. 4,341,078 describes a process for immobilizing liquid halogenated aromatic compounds being held in a vessel by injecting into the liquid a slurry of polymer particles and cryogenic refrigerant. Vaporization of the refrigerant causes dispersion of the polymer in the liquid resulting in their rapid dispersion and, subsequently, in the formation of a rubbery solid.

U.S. Pat. No. 4,383,868 describes a method for treating spillage of hazardous liquids (e.g. anhydrous hydrogen fluoride and concentrated hydrofluoric acid) by contacting the liquid with a solid particulate mixture containing both a polyacrylamide and a polyalkyl(alk)acrylate to produce a gelatinous film on the surface of the liquid. This patent suggests that the mixture of polymers can be applied to the liquid via a mechanical device, such as those used to disperse solid particulate fire extinguishing materials.

U.S. Pat. No. 6,177,058 describes gelatinous mixtures of hydrogen fluoride (HF) and sodium polyacrylate or polyacrylamide from which the hydrogen fluoride is recoverable.

Notwithstanding these developments, there remains a need for a method for rapidly restraining a hazardous material, particularly under conditions that increase the risk of an accidental spillage of the hazardous material from a receptacle.

SUMMARY OF THE INVENTION

The present inventors have found compositions, methods and systems for restraining chemical discharge that involve rapidly contacting a hazardous material with a binding agent of the present invention. In certain preferred embodiments the hazardous material is located in a receptacle or container. Preferably, the binding agent is propelled into contact with the hazardous material when a predetermined event exists, such as sudden deceleration or listing of the receptacle, that increases the risk of accidentally discharging or leaking the hazardous material from the receptacle. Contacting the hazardous liquid with the binding agent forms a composition that reduces the likelihood of accidentally discharging the hazardous material into the ambient environment and/or minimizes the damage caused by discharge in the event discharge occurs. For example, the binding agent may be in the form of a gel, and/or may be a gel formed in situ, and operates to absorb and/or restrain the hazardous material and, thus, the hazardous material is less likely to leak from the receptacle as a result, for example, of the receptacle being tipped and/or of the receptacle being structurally compromised. The binding agent may also form a composition having a vapor pressure below ambient pressure, thereby reducing the likelihood that the hazardous material would be lost via evaporation. Thus, the method substantially reduces the risk of spilling or otherwise accidentally discharging the hazardous material into the environment.

Accordingly, one aspect of the present invention is a method for restraining a chemical discharge comprising: (a) deploying a binding agent into a receptacle containing a hazardous material in a liquid state upon the occurrence of at least one predetermined event that increases the risk of accidentally discharging or leaking the hazardous material from the receptacle; and (b) contacting the hazardous material with the binding agent to form a composition comprising at least a portion of the hazardous material and the binding agent and having at least one property selected from: (1) a solid or semisolid state; (2) a viscosity greater than the viscosity of the hazardous material, as measured at ambient conditions; (3) a vapor pressure lower than the vapor pressure of the hazardous material, as measured at ambient conditions; and (4) a surface tension greater that the surface tension of hazardous material, as measured at ambient conditions.

According to another aspect of the invention, provided is a hazardous chemical restraint system comprising a receptacle having an interior for holding a hazardous material in liquid state; one or more modules containing a binding agent and a propellant, said module having a frangible surface in fluid communication with the interior of the receptacle; a detector (preferably embodied in an instrument) for detecting a predetermined event that increases the risk of accidentally discharging or leaking the hazardous material from the receptacle; and an initiator (preferably also embodied in an instrument which may be the same or different than the instrument in which the detector is embodied) for initiating deployment of the binding agent through said frangible surface of said canister and into the interior of said receptacle.

DESCRIPTION OF PREFERRED EMBODIMENTS OF THE INVENTION

The present invention provides compositions, methods and systems for restraining a chemical discharge, preferably by immobilizing a hazardous liquid in a receptacle, and thereby mitigating the risk and/or damage of an accidental spillage of the liquid from a receptacle, and/or by decreasing the vapor pressure and/or surface tension of the hazardous, thereby lessening the risk of discharging of the hazardous material into the ambient atmosphere and/or reducing damage associated with discharge should it occur. In preferred embodiments, the hazardous material is contacted by a binding agent, such as an absorbent polymer or complexing agent, to form a composition comprising at least a portion of the hazardous material, wherein the composition is a solid, semisolid, or viscous liquid, and/or has a vapor pressure that is at or below ambient pressure, and/or has a high surface tension. Preferably, the restraining is performed in response to an event that increases the risk of accidentally discharging the hazardous material from the receptacle.

As used herein, the term restraining means to hold back or keep in check. Examples of restraining include, but are not limited to, immobilization and suppression of a propensity to volatilize and/or aerosolize.

As used herein, the term discharging means partially or wholly releasing a substance from confinement. Examples of discharging include, but are not limited to, spilling, leaking, ejecting, vaporizing, evaporating, outgassing, scattering, shedding, dropping, and the like.

As used herein, the term immobilizing means to impede movement.

As used herein, the term hazardous means a property or condition that imperils or otherwise adversely effects the safety or stability of a person, plant, animal, or the environment, or is a nuisance if unrestrained. Examples of hazardous materials include, but are not limited to, those that are flammable, corrosive, explosive, carcinogenic, toxic, mutagenic, odoriferous, radioactive, volatile, or otherwise chemically unstable.

As used herein, the term binding agent means a material having the capacity to exert or create a strong chemical or physiochemical attraction between two substances. Examples of strong chemical and physiochemical attractions include ionic bonding, nonionic bonding, electrophilicity, electrophobicity, and the like. Examples of binding agents include, but are not limited to, absorbent polymers, such as hydrogels, and complexing agents, such as ionic liquids.

By an event that increases the risk of accidental discharge, it is meant the existence of a condition or factor that increases the risk that material in the container will be discharged in an unintended or uncontrolled manner, such as may occur, for example, if the structural integrity of a receptacle is, or would likely be, compromised. Such conditions include, but are not limited to, sudden acceleration, sudden deceleration, listing, increase in temperature, change in pressure, and presence of the hazardous chemical in the ambient environment of the receptacle. Such conditions, could result from one or more of the following situations: collision, fire, derailment, breach, collapse, hostile attack, cracking, weathering, and deterioration.

In preferred embodiments, the present method involves the step of manually or automatically deploying a binding agent into a receptacle containing a hazardous material in a liquid state upon the occurrence of at least one predetermined event that increases the risk of accidentally discharging or leaking the hazardous material from the receptacle.

The binding agent is preferably deployed upon the occurrence of an event, as described above, that increases the risk of accidental discharging the hazardous material from the receptacle. Preferably, the event is automatically detected by an instrument such as linear accelerometer, angular accelerometer, gyroscope, thermometer, thermocouple, thermistor, strain gauge, piezoresistor, mechanical deflection pressure sensor, chemical detection sensor (for detecting the presence of a hazardous material in the receptacles ambient environment), and optical sensor (for visually detecting a dispersement of hazardous material from the receptacle). Combination of two or more of these instruments can also be utilized. In certain preferred embodiments, the instruments are incorporated into a microelectromechanical system (MEMS), particularly a MEMS accelerometer. In certain other embodiments, the instruments are incorporated into an inertial navigation system (INS). Such systems may also include a triggering algorithm to determine optimum deployment conditions and to detect situations when deployment is unnecessary.

Preferably, the binding agent is in a form that is easily and rapidly deployable into a liquid or onto the surface of the liquid. Examples of easily and rapidly deployable forms include liquid and solids such as powder, granules, pellets, fibers, or combinations thereof.

Any means for deploying the binding agent into liquid or onto its surface can be used with the present invention without limitation. Preferably, the deployment means quickly brings the binding agent into contact with the liquid. Deployment time, which is time elapsed from point of initial deployment to the point of first contact between the hazardous material and the binding agent, is preferably less than about 1.0 seconds, and more preferably is less than about 0.1 seconds.

In certain embodiments, the deployment means propels the binding agent with a force adequate to substantially disperse the binding agent throughout the hazardous liquid. That is, the binding agent is mixed with the hazardous liquid so as to rapidly and substantially form a less hazardous composition. In other embodiments, the deployment means propels the binding agent onto the surface of the hazardous liquid where it forms a protective layer over the liquid. In still other embodiments, the deployment means propels the binding agent onto the surface or into one or more discrete portions of the hazardous liquid from which it is subsequently mixed with the hazardous liquid. It will be appreciated that a device or method may comprise any combination of two or more of these and other deployment means.

In certain embodiments, the binding agent is deployed into a receptacle containing a hazardous liquid by releasing a compressed gas, by generating a gas, or by releasing mechanical energy from a spring. Preferably, the binding agent is propelled with a gas, similar to the means used to deploy a vehicle air bag. In certain embodiments, the binding agent, along with a propellant, is packed into a module having a frangible surface that is in fluid contact with the interior of receptacle. The modules may be of any practical shape without limitation. Examples of modules include canisters, bladders, and pipes. The frangible surface preferably is constructed of a thin foil that is chemically inert with respect to the hazardous material in the receptacle. Preferred foils include those constructed from metals, carbon, ceramics, polymers, and fluoropolymers.

Certain preferred propellants comprise a fuel and an oxidizer, and may optionally include other ingredients such as burn rate modifiers. Once the fuel is ignited, it rapidly burns in the presence of the oxidizer to produce a sudden burst of gas. This burst of gas easily breaks the frangible surface and propels the binding agent out of the canister and into the receptacle where it contacts the hazardous liquid. Preferred fuels include azide, tetrazole, triazole, and salts thereof.

In certain embodiments, the propellant may comprise a compressed gas, such as air, nitrogen, carbon dioxide, or a noble gas instead of, or in addition to, an oxidizable fuel. For such embodiments, the compressed gas is rapidly released within the canister which breaks its frangible surface and propels the binding agent out of the canister similar to way the oxidized fuel propels the binding agent.

The receptacle for holding the hazardous liquid can generally be any type, shape, or size receptacle known in the art. For example, the receptacle can be open or closed (e.g., an enclosure), can be spherical, cylindrical, boxed-shaped, or irregularly shaped, can be insulated or un-insulated, can be pressurized or un-pressurized, can have an internal volume from less than about 1 ounce to about 4 million barrels or more. Examples of preferred receptacles include, but are not limited to, flasks, barrels, semi-tractor tanker, railroad tanker, super-tankers, and pipelines.

Preferably, the present methods also involve the step of contacting the hazardous material with the binding agent to form a composition comprising at least a portion of the hazardous material and the binding agent and having at least one property selected from a solid or semisolid state, a viscosity greater than the viscosity of the hazardous material at ambient conditions, a vapor pressure lower than the vapor pressure of the hazardous material at ambient conditions, and a surface tension greater than the surface tension of the hazardous material.

Preferably, the binding agent and hazardous material (which is preferably a liquid) undergo rapid transformation to form a composition that is a solid or semisolid, and/or has a higher viscosity, lower vapor pressure, and/or higher surface tension, as compared to hazardous material itself. Compared to liquids, compositions that are solid or semisolid are more apt to remain within the receptacle even if the receptacles integrity is compromised. Likewise, liquids having a high viscosity flow slowly, and thus are more likely to remain in the receptacle. Compositions having a low vapor pressure are not volatile and, thus, do not emit hazardous vapors that are difficult to corral.

In certain preferred embodiments, the composition binds the hazardous material in such a way as to readily release the hazardous material under certain conditions, such as changing the temperature and/or pressure of the composition. In such embodiments, the hazardous material may be recovered after it has been re-secured.

The choice of binding agent is primarily determined based upon the hazardous material held in the receptacle. Examples of hazardous materials that may be practiced with the present invention include, but are not limited to, nitric acid, concentrated sulphuric acid, concentrated hydrochloric acid, aqueous sodium cyanide, anhydrous sodium cyanide, aqueous hydrogen cyanide, anhydrous hydrogen cyanide, bromine, boron trifluoride, ammonia, phosphine, titanium tetrachloride, oleum, chlorosulphonic acid, chlorine, fluorine, aqueous hydrogen fluoride, anhydrous hydrogen fluoride, phosgene, petroleum, and derivatives thereof. As used herein, the term derivative means a compound or chemical structure having the same fundamental structure, underlying chemical basis, or chemical properties as the relevant related compound. Such derivatives are not limited to, but may include, a compound or chemical structure produced or obtained from the relevant related compound.

In certain preferred embodiments, the binding agent is an absorbent material. Particularly preferred absorbent materials are absorbent polymers. Examples of absorbent polymers include, but are not limited to, polyacrylamide, polyalkylacrylamide, polyacrylate, polyalkylacrylate, polyacrylic acid salts, cross-linked polyacrylamide-polyacrylate copolymer, cellulose ethers, modified starches, starch derivatives, natural gum derivatives, ethylene oxide polymer, polyethyleneimine polymer, polyvinyl pyrrolidone polymer, and mixtures or copolymers thereof. Such binders are described, for example, in U.S. Pat. No. 4,383,868 and U.S. Pat. No. 6,177,058, each of which are incorporated herein by reference.

These absorbent polymers are particularly preferred for binding nitric acid, concentrated sulphuric acid, concentrated hydrochloric acid solution, aqueous sodium cyanide solution, bromine, titanium tetrachloride, oleum, chlorosulphonic acid and anhydrous hydrogen fluoride.

For binding anhydrous and aqueous hydrogen fluoride, polyacrylate-polyacrylamide cross-linked copolymers, particularly those derived from a polyacrylic acid salts, and mixtures of cross-linked polyacrylamide-polyacrylate copolymer and at least one of polyacrylamide, polyalkylacrylamide, polyacrylate, polyalkylacrylate, and polyacrylic acid salts.

In certain embodiments, the binding agent is a complexing agent. Preferred complexing agents include, but are not limited to, organic salts, particularly organic salts that form ionic liquids. Examples of preferred organic salts include, but are not limited to, salt comprising a cation selected from the group consisting tetraalkylphosphonium, tetraalkylammonium, pyridinium, N-alkylpyridinium, N,N'-dialkylimidazolium, and imidazolium. Particularly preferred organic salts is a substituted imidazolium chloride, with 1-methyl-3-ethylimidazolium chloride being more preferred. These organic salts are particularly useful for binding chlorine. Preferred compositions of these organic salts and chlorine have a vapor pressure that is lower than the ambient vapor pressure.

Other binding agents that may be practiced with the invention include polyacrylic acid which is useful for binding aqueous and anhydrous hydrogen cyanide and ammonia; calcium stearate which is useful for binding petroleum and petroleum-based compounds; and substituted imidazolium tetrafluoroborate, which is useful in producing an electrolyte with bromine trifluoride.

EXAMPLES

Example 1

A transparent, anhydrous hydrogen fluoride compatible, cylinder, was fitted with a rupture disk rated to 20 psi and was loaded with 200 grams of anhydrous HF. On the other side of the rupture disk 10 grams of a sodium polyacrylate-polyacrylamide copolymer was loaded. This side was provided with a ball valve connected to a 50 psi Nitrogen gas supply. The experiment was videotaped.

On opening the quick-acting ball valve, the nitrogen gas pressurized the polymer and the rupture disk, causing the disk to rupture and release the polymer into the anhydrous HF. The polymer powder absorbed the anhydrous HF within, turning the entire liquid anhydrous HF into a semi-solid immobilized gelled mass within several minutes.

Having thus described a few particular embodiments of the invention, it will be apparent to those skilled in the art, in view of the teachings contained herein, that various alterations, modifications, and improvements not specifically described are available and within the scope of the present invention. Such alterations, modifications, and improvements, as are made obvious by this disclosure, are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for restraining a chemical discharge comprising:
providing a receptacle containing a hazardous material in a liquid state;
providing a module having a frangible surface that is in fluid communication with the interior of the receptacle, the module containing a binding agent and a propellant;
deploying the binding agent into the receptacle containing a hazardous material in a liquid state upon the occurrence of at least one predetermined event that increases the risk of accidentally discharging or leaking the hazardous material from the receptacle, the deploying comprising breaking the frangible surface of the module; and contacting the hazardous material with the binding agent to form a composition comprising at least a portion of the hazardous material and at least a portion of the binding agent and having at least one property selected from the group consisting of a solid or semisolid state, a viscosity greater than the viscosity of the hazardous material, a vapor pressure lower than the vapor pressure of the hazardous material, and a surface tension greater than the surface tension of the hazardous material.

2. The method of claim 1 wherein said deploying is manually initiated in response to said occurrence of said event.

3. The method of claim 1 wherein said deploying is automatically initiated in response to said occurrence of said event by an instrument capable of detecting said event.

4. The method of claim 1 wherein said event is selected from the group consisting of sudden acceleration of the receptacle, sudden deceleration of the receptacle, listing of the receptacle, increase of the temperature of the receptacle, increase of the temperature of the hazardous material, change in pressure inside the receptacle, and presence of the hazardous chemical in the ambient environment of the receptacle.

5. The method of claim 3 wherein said instrument is at least one member selected from the group consisting of linear accelerometer, angular accelerometer, gyroscope, thermometer, thermocouple, thermistor, strain gauge, piezoresistor, mechanical deflection pressure sensor, chemical detection sensor, and optical sensor.

6. The method of claim 3 wherein said instrument is incorporated into a microelectromechanical system.

7. The method of claim 3 wherein said instrument is incorporated into an inertial navigation system.

8. The method of claim 1 wherein said binding agent is deployed as a liquid, powder, granules, pellets, fibers, or a combination of two or more thereof.

9. The method of claim 8 wherein said deploying comprises propelling the binding agent, the propelling being one or more members selected from the group consisting of releasing a compressed gas, generating a gas, and releasing mechanical energy from a spring.

10. The method of claim 9 wherein said deploying comprises propelling the binding agent by generating a gas, wherein said generating a gas involves oxidizing a fuel.

11. The method of claim 1 wherein said hazardous material is selected from the group consisting of nitric acid, concentrated sulphuric acid, concentrated hydrochloric acid, aqueous sodium cyanide, anhydrous sodium cyanide, aqueous hydrogen cyanide, anhydrous hydrogen cyanide, bromine, Boron trifluoride, ammonia, phosphine, titanium tetrachloride, oleum, chlorosulphonic acid, chlorine, fluorine, aqueous hydrogen fluoride, anhydrous hydrogen fluoride, phosgene, petroleum, and compounds derived therefrom.

12. The method of claim 1 wherein said contacting immobilizes said hazardous material.

13. The method of claim 12 wherein said composition is a solid or semisolid.

14. The method of claim 13 wherein said composition is a film which substantially covers the exposed surface of the hazardous material.

15. The method of claim 13 wherein said composition is a gel in which a substantial portion of said hazardous material is embodied.

16. A method for restraining a chemical discharge comprising:

providing a receptacle containing a hazardous material in a liquid state;

providing a module having a frangible surface that is in fluid communication with the interior of the receptacle, the module containing a binding agent and a propellant;

automatically detecting with an instrument at least one predetermined event that increases the risk of accidentally discharging or leaking the hazardous material from the receptacle, wherein the instrument is incorporated into a microelectromechanical system that further comprises a triggering algorithm;

deploying the binding agent into the receptacle containing a hazardous material in a liquid state upon the occurrence of at least one predetermined event that increases the risk of accidentally discharging or leaking the hazardous material from the receptacle, the deploying comprising breaking the frangible surface of the module; and contacting the hazardous material with the binding agent to form a composition comprising at least a portion of the hazardous material and at least a portion of the binding agent and having at least one property selected from the group consisting of a solid or semisolid state, a viscosity greater than the viscosity of the hazardous material, a vapor pressure lower than the vapor pressure of the hazardous material, and a surface tension greater that the surface tension of the hazardous material.

17. The method of claim 16, wherein the propellant comprises a fuel and an oxidizer, wherein the fuel is selected from the group consisting of azide, tetrazole, triazole, and salts thereof.

18. The method of claim 16, wherein the propellant comprises a compressed gas selected from the group consisting of air, nitrogen, carbon dioxide, and a noble gas.

19. The method of claim 16, wherein the hazardous material is anhydrous hydrogen fluoride and the binding agent comprises a polyacrylate-polyacrylamide cross-linked copolymer.

* * * * *